United States Patent [19]

Bollani

[11] Patent Number: 4,464,986
[45] Date of Patent: Aug. 14, 1984

[54] DEVICE FOR REDUCING THE VIBRATION OF A PRESS SECTION CONSTITUTED BY TWO OR MORE ROLLS PRESSED ONE AGAINST THE OTHER IN A PAPER MANUFACTURING MACHINE

[75] Inventor: Umberto F. Bollani, Turin, Italy

[73] Assignee: Beloit Corporation, Beloit, Wis.

[21] Appl. No.: 401,738

[22] Filed: Jul. 26, 1982

[30] Foreign Application Priority Data

Jul. 31, 1981 [IT] Italy ............... 68079 A/81

[51] Int. Cl.³ ................................. B30B 3/04
[52] U.S. Cl. ................... 100/163 R; 100/169; 100/176; 162/358; 267/63 R; 267/141.1; 384/220
[58] Field of Search ........... 100/162 R, 163 R, 168, 100/169, 170, 171, 176, 163 A; 162/358; 308/184 R; 384/215, 220; 267/136, 137, 141, 141.1, 63 R

[56] References Cited

U.S. PATENT DOCUMENTS

| | | | |
|---|---|---|---|
| 1,823,429 | 9/1931 | Jansson et al. | 267/63 R |
| 1,977,896 | 10/1934 | Saurer | 267/63 R |
| 2,364,443 | 12/1944 | Hornbostel | 100/169 X |
| 3,060,843 | 10/1962 | Moore et al. | 100/170 X |
| 3,199,442 | 8/1965 | Kuno et al. | 100/169 X |
| 4,077,316 | 3/1978 | Georget | 100/169 X |

FOREIGN PATENT DOCUMENTS

| | | | |
|---|---|---|---|
| 181599 | 11/1962 | Sweden | 100/169 |
| 226433 | 12/1924 | United Kingdom | 384/220 |

*Primary Examiner*—Peter Feldman
*Attorney, Agent, or Firm*—Hill, Van Santen, Steadman & Simpson

[57] ABSTRACT

A mechanism for a press section of a papermaking machine including a press having first and second press rolls forming a pressure loaded press nip therebetween with a support frame and end bearings for the first roll with a support carrying the end bearings on the frame including first and second layers of deformable elastic material with a plate connected to the bearing between the layers of material and plates on the outer surfaces of the layers connected to the frame so that vibrational forces normal to the direction of movement of the web through the nip are passed through the layers of elastic material.

4 Claims, 7 Drawing Figures

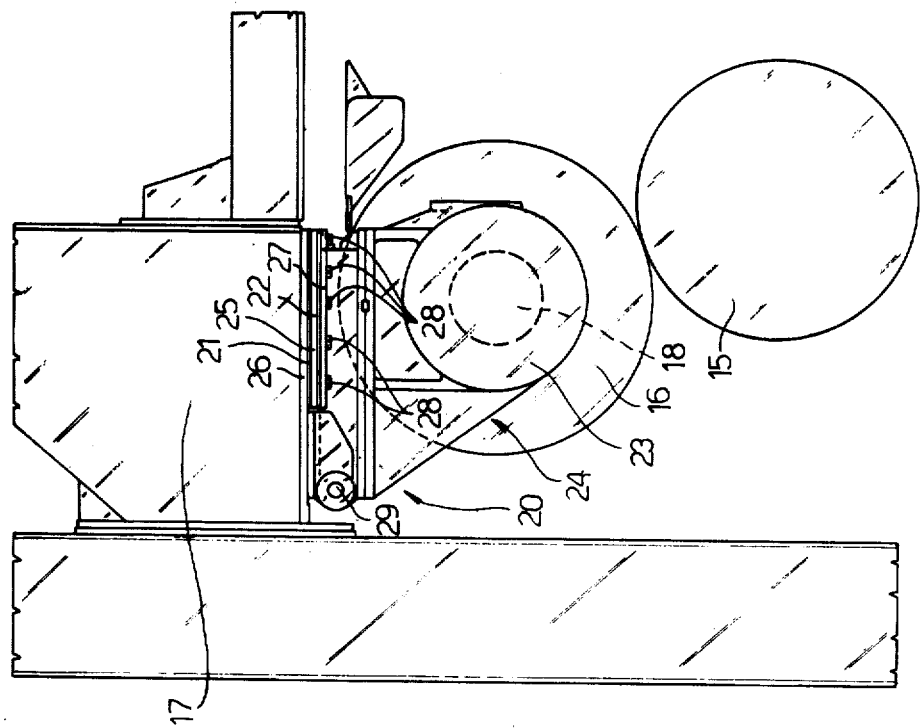
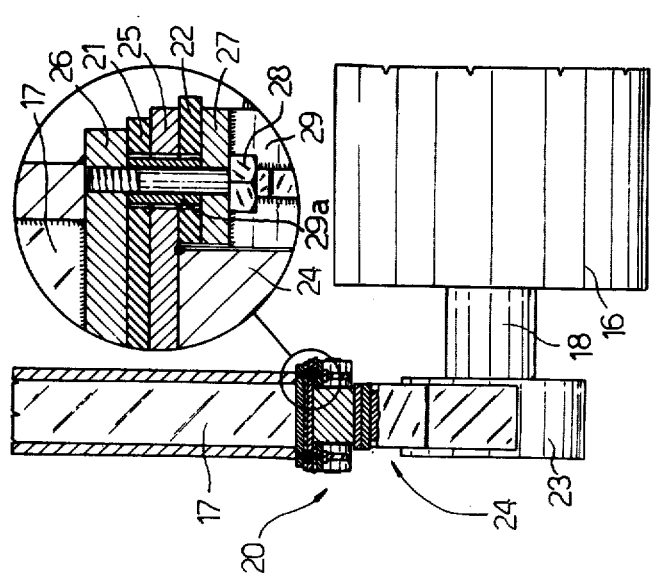
Fig. 2
Fig. 3

DEVICE FOR REDUCING THE VIBRATION OF A PRESS SECTION CONSTITUTED BY TWO OR MORE ROLLS PRESSED ONE AGAINST THE OTHER IN A PAPER MANUFACTURING MACHINE

BACKGROUND OF THE INVENTION

The invention relates to improvements in papermaking machines, and more particularly to improvements in press sections and to an arrangement for reducing the vibration which occurs between two or more press rolls loaded to form a press nip for dewatering a traveling web of paper.

In papermaking machines, the web of paper is made continuously by depositing a slurry of fibers of wood or other vegetable substances with the addition of additives onto a traveling foraminous wire in order to form a layer which is dewatered through the wire and subsequently pressed and dried to form a continuous paper web or sheet. During this operation, the web formed on the wire is transferred, usually with one or two water absorbing felts between the succession of pairs of press rolls. A typical press roll will have opposed rolls pressure loaded against each other with one of granite and one of steel, although other materials may be used, which are pressed one against the other with considerable force to press water from the paper web and force it into the felt.

In the pressing operation the rolls necessarily operate at the high speeds of the machine and are subject to persistent vibration which leads to nonuniformity in the paper web and in the felt. Because the rolls are pressed together with substantial pressure, vibrations create minute variations in this pressure which translate into differences in water extraction, and the sheet produced, therefore, is not perfectly uniform and regular. Also, because of the high rotational speed of the rolls, load noise is produced, and in some instances the vibration will cause damage to the rolls and support members and other component parts.

It is accordingly an object of the present invention to provide a mechanism for satisfactorily reducing the vibration of press rolls in a papermaking machine which eliminates the disadvantages referred to and which inherently accompany vibration.

A further object of the invention is to provide an improved vibration absorbing or preventing mechanism of simplified construction for a paper press in a papermaking machine which has the operating life of the press and which does not require repair or attention during its operating life.

In accordance with the principles of the invention, the device contemplates the provision of a paper machine press with a pair of rolls forming a press nip with each of the rolls being supported by a pair of bearings fixed to the frame of the assembly for supporting the rolls. At least one of the rolls is provided with a vibration absorbing mechanism which includes a pair of layers of deformable elastic material disposed between the bearings and the frame. One of the layers is disposed so that it deforms by compression when the movement of the bearing is induced by vibration in a first direction, and the other layer is disposed in such position that it deforms by compression when the movement of the bearing takes place in the opposite direction.

Other advantages, features and objects will become more apparent with the teaching of the principles of the invention in connection with the disclosure of the preferred embodiments thereof in the specification, claims and drawings, in which:

DESCRIPTION OF THE DRAWINGS

FIG. 2 is an enlarged front view of one embodiment of the invention with parts omitted for clarity, as compared with FIG. 1;

FIG. 3 is a fragmentary view, taken partially in section, substantially along line III—III of FIG. 1 with a fragmentary portion illustrated within the circle showing details of construction;

DESCRIPTION OF THE PREFERRED EMBODIMENTS

Figure 1:
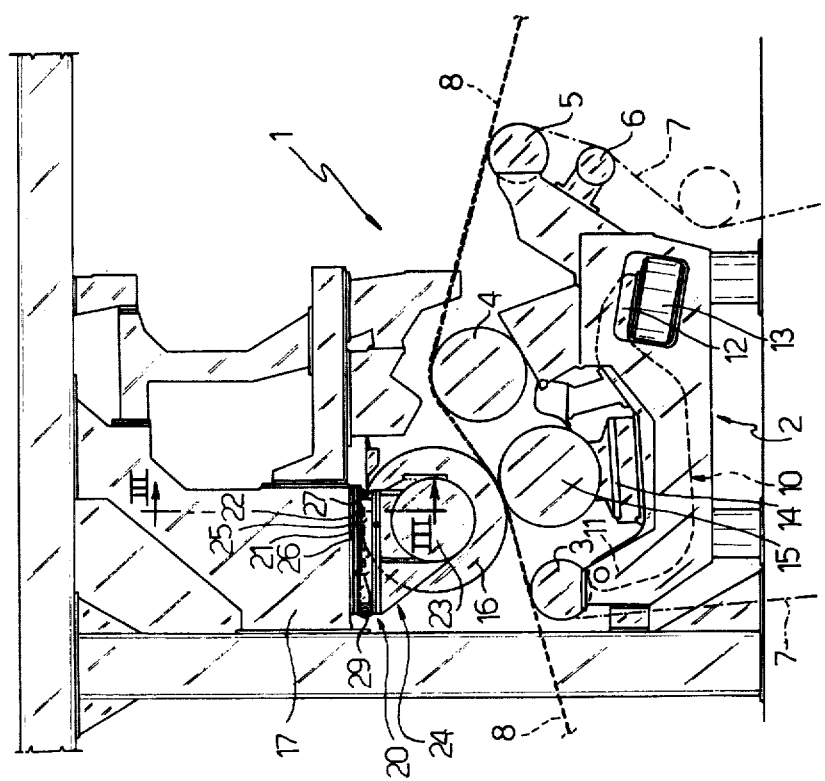
FIG. 1 is a front view of a press section in a papermaking machine showing the ends of rolls of the press, and constructed and operating in accordance with the principles of the invention.

As illustrated in FIGS. 1-3, FIG. 1 illustrates overall a press for a papermaking machine having an upper frame 2 with supports for rolls shown at 3, 4, 5 and 6. An endless felt 7 carries a web 8 through the nip between press rolls 15 and 16. The press 1 also includes a lever arm 10 housed in the frame 2 and being constructed substantially of U-shaped cross-section. A first end 11 of the lever 10 is hinged to the frame, and the other end 12 rests on a hydraulic cylinder 13. Two support elements 14 rest on an intermediate portion of the lever arm 10, and by means of suitable bearings, not shown in detail, the support elements 14 support the ends of a shaft which carries the roll 15. The roll 15 is normally of steel or cast iron and has a suitable outer coating layer and is pressed by the action of the lever 10 against the roll 16. The roll 16 is usually of granite or other coated material and is supported and carried on an upper frame member 17. The force exerted by the roll 15 on the roll 16 and thus on the felt 7 and on the web 8 is obtained by the force produced by the hydraulic or pneumatic cylinder 13 so that water is expressed from the web into the felt as the two travel together through the nip between rolls 15 and 16. As the rolls rotate, either by being provided with drive means, not shown, or due to contact with the web and felt, vibrations tend to be induced which are absorbed and reduced or eliminated by the vibration eliminating mechanism indicated at 20, and by absorbing the vibration of the upper rolls, the device will also tend to absorb the vibrations of the lower roll.

The particular embodiment of the device includes resilient vibration absorbing members which absorb the vibration of the rolls in a direction normal to the path of travel of the web through the nip. The vibration absorbing members are part of a support carrying the bearings for the upper roll on the frame member 17 and the support is arranged so that displacement in the direction parallel to the path of travel of the web is prevented by nonyieldable portion of the support. The vibration absorbing device includes a pair of layers of deformable elastic material 21 and 22, FIG. 3, which are disposed between each of the end roll bearings 23 and the press frame 17. One of the layers is disposed in a position such that it deforms by compression when the movement of the bearing 23 induced by vibration takes place in a first direction and the other layer is disposed in a position such that it deforms by compression when the movement of the bearing induced by vibration takes place in a second direction which is opposite the first. The direction of vibration which is absorbed is along a straight line normal to the direction of web travel or, in other words, essentially along a straight line which is normal to the surfaces of the two rolls at the nip or in other words, along a line passing through the axial centers of the rolls.

The construction of the mechanism is shown in FIGS. 1-3 and includes a plate 25 which is rigidly connected to the bearing 23 by a bearing bracket member 24. The layers of material 21 and 22 are disposed on opposite sides of said plate 25, and also disposed between an upper plate 26 and a lower plate 27 rigid with the frame 17. The upper plate 26 is suitably secured to the frame, and the lower plate 27 is made rigid with the frame by utilizing bolts 28 with their heads secured to the lower plate and the upper ends threaded into the rigid plate 26 which is rigid with the frame. The plate 25, however, has holes therethrough which permit it to move up and down relative to the bolts 28. A suitable loose bushing 29a surrounds the bolts, and as the bolt 28 is tightened, the bushing 29a is pulled tight between the plates 26 and 27.

Between the bearing 23 and the frame 17, the support includes a mechanical locking member which permits movement in the direction normal to the nip in order to absorb the vibration, but which permits no movement in the direction parallel to the nip. In the arrangement of FIGS. 1-3, this locking member which is part of the support consists of a hinge 29, FIGS. 1 and 2, positioned between the support member 24 and the frame 17. The hinge allows the bearings to move up and down as shown in the drawings, but not laterally.

Figure 4:
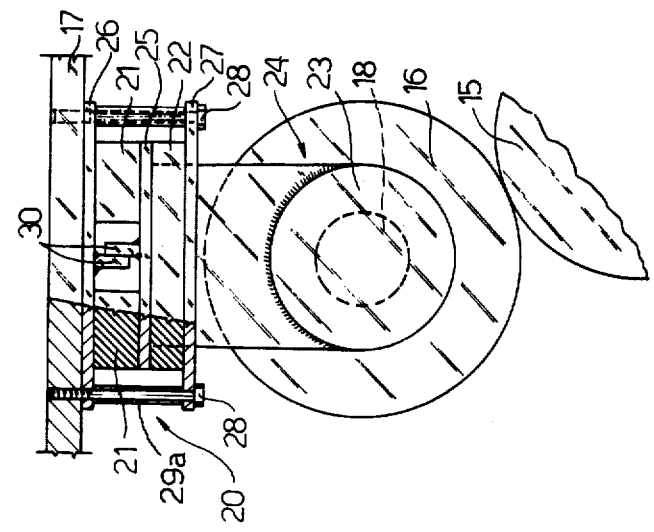
FIGS. 4 and 5 are fragmentary views, shown partially in section, of two additional embodiments of the mechanism.

In the arrangement of FIG. 4, the mechanical locking member which is part of the support is shown as a pair of tongues 30, one of which is attached to the rigid upper plate 26, and the other which is attached to the plate 25 movable with the bearing. An opening is provided through the pad 21 to accommodate these tongues, and the tongues have vertical sliding surfaces permitting up and down movement, but preventing lateral movement. The mechanical locking member, shown as tongues 30 in FIG. 4, and as a hinge 29 in FIG. 1, while shown in the preferred forms, may include other forms of structure such as a resilient arm or connecting rod, not shown, disposed between the frame and oscillating plate 25.

Figure 5:
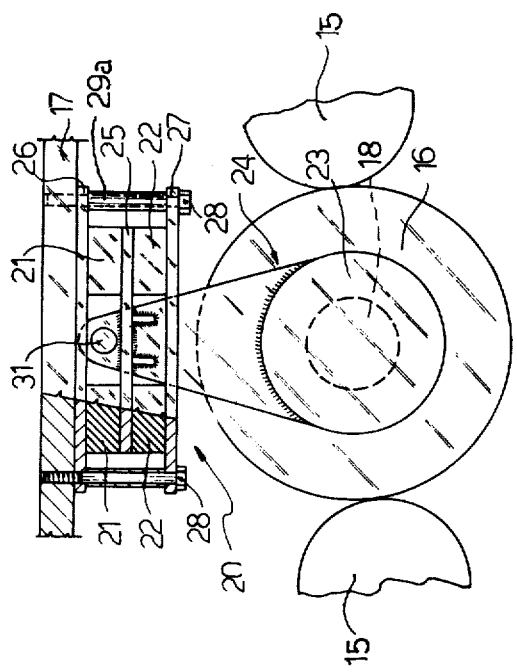

In the structure of FIG. 5, the support member 24 is swivel or swing mounted and is hinged by an overhead pintel pin. The plate 25 is rigid with the support member 24. For use of this arrangement, the pressing nip structure includes two opposed rolls 15 positioned on laterally opposite sides of the roll 16 so as to form two separate nips through which the web and felt pass for the pressing operation.

During the pressing operation, vibration arises which causes the roll 16 to undergo movements in a direction which is normal to the nip, or in other words, normal to the path of travel of the web through the nip. These vibration movements are substantially vertical in the construction of FIG. 1. When the vibration induces movement in an upward direction, the upper pad or layer 21 is deformed by compression and stores the kinetic energy generated by the vibration thus preventing this from being transmitted to the frame 17. Because of the nature of the materials of the layers 21 and 22, these are able to act effectively as shock absorbers. When the direction of movement induced by the vibration is reversed, the lower layer 21 compresses in the same manner. The pads 21 and 22 may be of various materials which have deformable elastic qualities such as rubber.

The operation of the device and the embodiments shown in FIG. 5 is similar to that described inasmuch as the layers 21 and 22 operate alternately by compression as a result of the rocking of the support 24 about the hinge pin 31 induced by vibration.

The presence of the mechanical locking members, the hinge 29, or the tongues 30, or the hinge pin 31 between the rolls prevent the components of the force which are directed along the plane of the travel of the web, from being able to act directly on the pads 21 and 22 which would not be able to support such movements. This permits the pads 21 and 22 to be designed for optimum vertical vibration absorption and are not required to be designed for lateral movement.

The layers or pads 21 and 22 can be of any deformable elastic material such as rubber, elastomer, plastics or the like. Conveniently, each of the layers can be constructed by superimposing a plurality of sheets of the material on each other and disposing a metal plate between two adjacent sheets.

Figure 6:
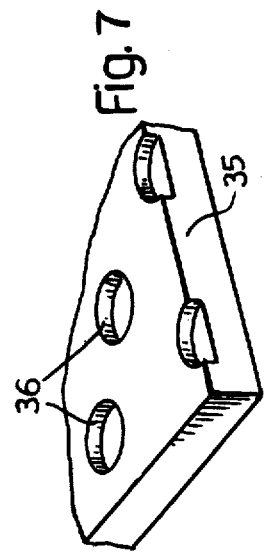
FIGS. 6 and 7 are fragmentary perspective views of resilient pads of alternate construction.
Figure 7:
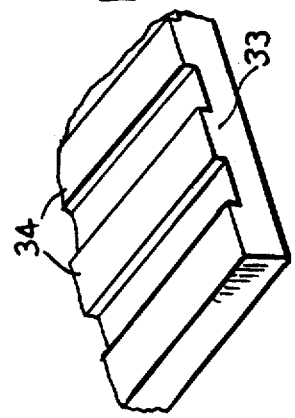

In one form, the deformability of the assembly can be increased such as by providing the surface of the pads with grooves in the manner shown in FIG. 6 wherein a pad 33 has ribs 34 on the surface. In another construction, as illustrated in FIG. 7, a pad 35 has a series of depressions 36 on the surface. Such ribs 34 or depressions 36 may be on one or both surfaces of the pads depending upon the physical characteristic desired.

Thus, I have provided an improved press mechanism for a papermaking machine which provides the objectives and advantages above set forth, and it will be understood that other equivalent structures and methods may be employed within the spirit and scope of the invention.

I claim as my invention:

1. A mechanism for a press section of a papermaking machine comprising in combination:
first and second press rolls forming a pressure loaded press nip therebetween for receiving a traveling web moving in a machine direction;
a support frame for the rolls;
bearings for said rolls including end bearings for the first roll;
a support carrying said end bearings on the frame including a first layer of deformable elastic material between the end bearings and the frame and positioned to deform with movements of the first roll in a first direction toward the frame at right angles to the axis of the roll;
including a second layer of deformable elastic material located between said end bearings and the frame and positioned to deform with movement of the first roll in the second direction opposite the first direction away from the frame;
and said connection including a pair of parallel tongues having sliding engaging surfaces extending parallel to said first and second directions and accommodating movement of the end bearings in said first and second directions, said surfaces being nonmovable toward each other in the machine direction.

2. A mechanism for a press section of a papermaking machine comprising in combination:
first and second press rolls forming a pressure loaded press nip therebetween for receiving a traveling web moving in a machine direction;
a support frame for the rolls;
bearings for said rolls including end bearings for the first roll;
a support carrying said end bearings on the frame including a first layer of deformable elastic material between the end bearings and the frame and positioned to deform with movements of the first roll in a first direction toward the frame at right angles to the axis of the roll;
including a second layer of deformable elastic material located between said end bearings and the frame and positioned to deform with movement of the first roll in the second direction opposite the first direction away from the frame;
and the support including a first plate secured to the end bearing by a first member connected to the center of the plate and a second plate secured to the frame with said layers of elastic material on opposite sides of said first plate and on both lateral sides of said member, the first layer being between said first and second plates, and a third plate secured to the second plate by second members and located on the opposite side of said second elastic material layer relative to said first plate, said second members located laterally outwardly of the elastic material so that the elastic material is located between said first and second members.

3. A mechanism for a press section of a papermaking machine comprising in combination:
first and second press rolls forming a pressure loaded press nip therebetween for receiving a traveling web moving in a machine direction;
a support frame for the rolls;
bearings for said rolls including end bearings for the first roll;
a support carrying said end bearings on the frame including a first layer of deformable elastic material between the end bearings and the frame and positioned to deform with movements of the first roll in a first direction toward the frame at right angles to the axis of the roll;
including a second layer of deformable elastic material located between said end bearings and the frame and positioned to deform with movement of the first roll in the second direction opposite the first direction away from the frame;
and said layers of deformable elastic material having spaced projections on the surface with plates in contact with the spaced projections and said plates connected to the frame and bearing respectively.

4. A mechanism for a press section of a papermaking machine comprising in combination:
first and second press rolls forming a pressure loaded press nip therebetween for receiving a traveling web moving in a machine direction;
a support frame for the rolls;
bearings for said rolls including end bearings for the first roll;
a support carrying said end bearings on the frame including a first layer of deformable elastic material between the end bearings and the frame and positioned to deform with movements of the first roll in a first direction toward the frame at right angles to the axis of the roll;
including a second layer of deformable elastic material located between said end bearings and the frame and positioned to deform with movement of the first roll in the second direction opposite the first direction away from the frame;
said layers of deformable elastic material having openings therethrough with plates in contact with the surfaces of the elastic material and said plates connected to the frame and bearing respectively.

* * * * *